Oct. 20, 1959 K. H. BARNES 2,909,012
LINK AND FLIGHT BAR ASSEMBLY IN A BLASTING MACHINE
Filed Jan. 28, 1957 2 Sheets-Sheet 1
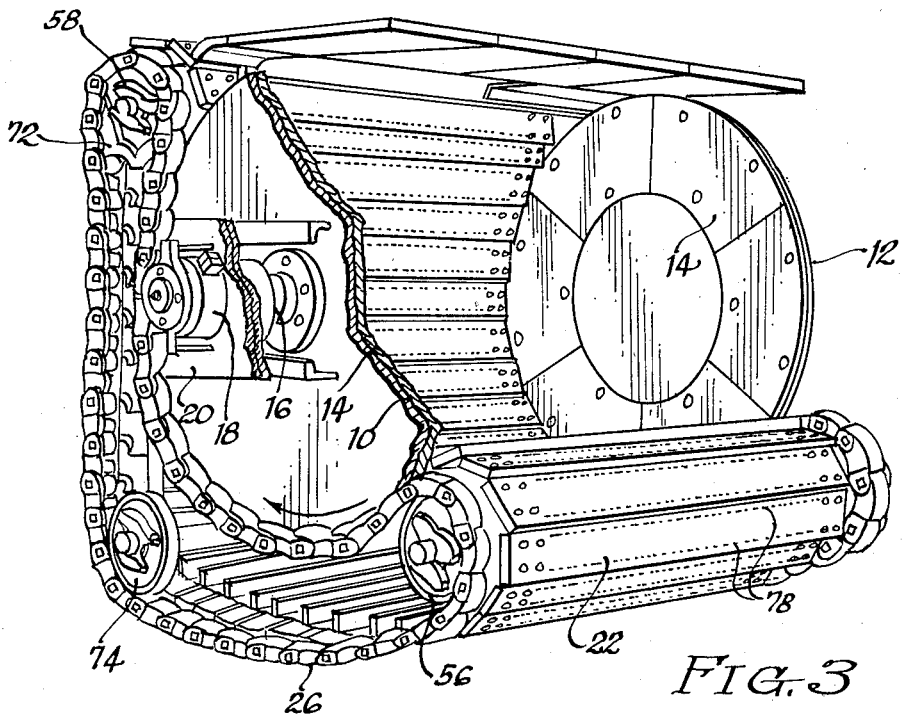
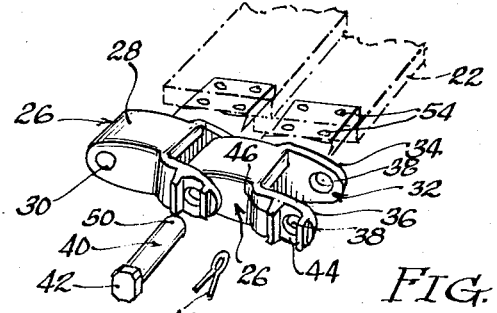
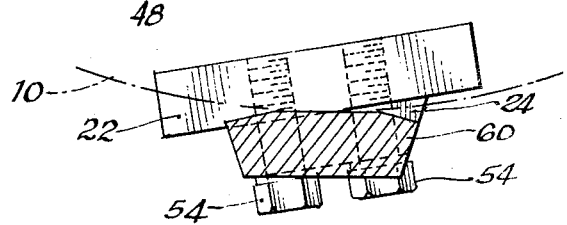
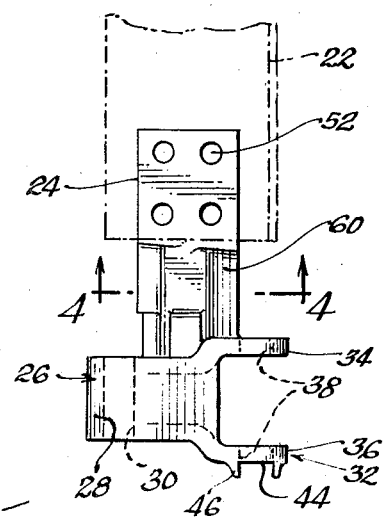
INVENTOR.
Kenneth H. Barnes
BY
Oms, McDougall, Williams & Hersh
Attorneys

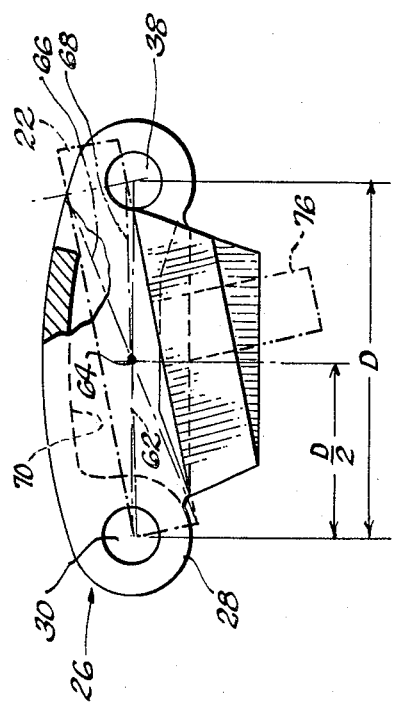
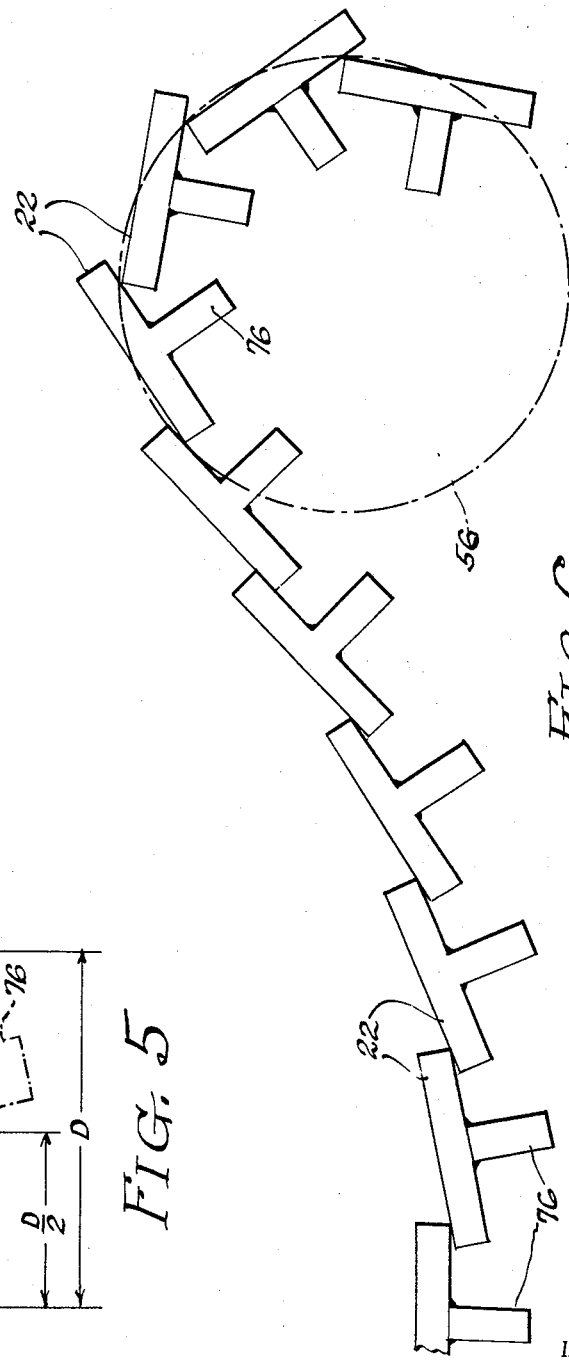

United States Patent Office 2,909,012
Patented Oct. 20, 1959

2,909,012

LINK AND FLIGHT BAR ASSEMBLY IN A BLASTING MACHINE

Kenneth H. Barnes, South Bend, Ind., assignor to Wheelabrator Corporation, Mishawaka, Ind., a corporation of Nebraska Application January 28, 1957, Serial No. 636,576

3 Claims. (Cl. 51—163)

This invention relates to a machine for cleaning the surfaces of articles, such as metal castings and the like, by throwing abrasives onto the surfaces of the articles as they are tumbled about in the path of the abrasives. It relates more particularly to a means for conveying the articles into and out of the machine and for providing for a continuous tumbling action within the machine during operation.

The invention is addressed to an improvement in a centrifugal blasting machine of the type described in the Peik Patent No. 2,104,055. Briefly described, such machines comprise a housing completely enclosing a conveying means formed of a plurality of flight bars which extend crosswise between endless chains for travel about a predetermined path with the flight bars in overlapping relation at their edges to form an endless, horizontally disposed belt on which the work or articles to be cleaned are supported. The upper flight of the belt travels between a driving sprocket and a guide roller spaced forwardly and below the sprocket. Between the rollers and sprockets there is provided a pair of spaced circular drums mounted for rotational movement about a horizontal axis between the sprockets and rollers with a peripheral portion of the drum extending rearwardly and below the sprocket and rearwardly and below the roller whereby the upper flight of the belt travels horizontally and in a downward direction beyond the roller and upwardly in a forwardly direction in advance of the sprocket. As a result, when the belt travels in the direction from the roller to the sprocket, the work will be carried up the belt and be caused to tumble forwardly continuously onto the underlying work. The endless belt doubles back beneath the upper flight for travel about the forward roller and about a rearward roller to the sprocket.

The area between the drums is substantially completely enclosed by the belt and other portions of the housing including a doorway through which access may be had to the top flight of the conveyor belt for loading and unloading the machine. One or more wheels for throwing abrasive particles into the housing and onto the work are mounted on the housing with suitable attachments for feeding and driving the units. Detailed description thereof will not be made since they form no part of this invention and are adequately described in the forementioned issued patent.

One of the difficulties which has been encountered in constructions of the type heretofore employed is the arrangement as between the flight bars and the chains whereby a spaced relationship is caused to develop between the bars as they are advanced with the chains about a radius, as when traveling over the front roller or over the driving sprocket. The existence of an opening between the flight bars enables entrance of the work into the space between flight bars. As a result, the work becomes clamped between the bars and is carried with the belt until jammed against other portions of the machine with consequent break-down or else the work prevents the flight bars from closing with resultant damage or break-down of the flight bars. Whatever the result, such damage often occurs as requires shut-down of the machine for repair or replacement of parts. This is most undesirable not only from the standpoint of cost in materials and labor but because it takes the machine out of operation with the resultant pile-up of production schedules.

Thus, it is an object of this invention to produce a machine of the type described which obviates the described difficulties in operation.

Another object is to produce a tumbling mill in which the flight bars of the conveyor are retained substantially in continuous contacting relationship one with the others adjacent thereto to provide a continuous conveyor which is free of openings between the flight bars during travel over curvilinear as well as along linear paths.

A further object is to produce a centrifugal blasting machine of the type described having improved means for conveying the work in tumbling action within the path of the abrasive particles thrown by the machine without interfering with the travel of the work or release of the abrasive particles for separation from the work and removal from the machine and without enabling the work to become jammed while being conveyed within the machine.

These and other objects and advantages of this invention will hereinafter appear and, for purposes of ilustration, but not of limitation, an embodiment of the invention is shown in the accompanying drawings in which—

Figure 1 is a perspective elevational view of a fragmentary portion of the machine showing the features of this invention;

Figure 2 is a perspective view of the elements which make up the link chain;

Figure 3 is a top plan view of the link chain with a flight bar attached thereto in outline;

Figure 4 is a sectional view taken along the line 4—4 of Figure 3;

Figure 5 is an elevational view partially in section of the chain link and flight bar attached thereto, and Figure 6 is a schematic view showing the arrangement of flight bars during travel through the various paths in which they are carried in the machine.

In the drawing, illustration is made only of the conveyor portion of the machine embodying the features of this invention comprising a pair of spaced drums 10 and 12 having liner plates 14 secured onto the inner faces thereof for purposes of protecting the drums against wear by the abrasive materials thrown at high velocity into the space between the drums. The drums are mounted on shafts 16 which are secured at their ends in journals 18 fixed to the frame plates 20 of the machine for enabling rotational movement of the drums about a horizontal axis.

A plurality of flight bars in the form of elongate flat plates 22, dimensioned to have a length corresponding to the spaced relation between the linings 14, are fixed at their lateral edges upon pads 24 integral with the chain links 26, one pair of which is illustrated in greater detail in Figures 2 and 5 of the drawings.

Each link 26 is formed with a hub portion 28 in the forward end having an opening 30 extending crosswise therethrough and having a yoke portion 32 at the rearward end with legs 34 and 36 spaced laterally apart by an amount corresponding to the width of the hub 28. The end portions of the legs 34 and 36 are provided with openings 38 adapted to be aligned in registry with the opening 30 through the hub portion of the following link to enable passage of a pin 40 therethrough pivotally to connect the yoke of one link with the hub of the next.

One of the important concepts of this invention resides in the improvement of the link or chain assembly to enhance the pivotal connection while minimizing the wear thereof. For this purpose, the pin 40 is formed with a head 42 of polygonal shape to be received in seating relation within a groove 44 formed between retainer walls 46 extending laterally in parallel relation from the outer walls of the yoke 32 about the opening 38 to prevent relative turning movement between the pin and the link. Thus the pin is limited for relative turning movement within the hub section 28 thereby to distribute the load over a much greater area as compared to turning movement within the yokes 32 and 36. In this manner, a better guiding and bearing relation is caused to be established with minimum wear on parts thereby to extend the life of the parts as much as two to three fold. The pin 40 is held in the assembled relation by a cotter pin 48 which extends through an opening 50 provided in the end portion of the pin which projects beyond the assembled yoke and hub members.

Integral with the link and extending laterally from the center thereof is a pad 24 to which the lateral edges of the flight bars 22 are secured. Each pad is provided with a plurality of openings 52 for enabling bolts 54 to extend therethrough securely to fix the ends of the flight bars to the pads.

The flight bars 22 comprise elongate members of highly abrasion resistant metal dimensioned to have a length slightly less than the distance between the drum linings 14 so as to avoid the existence of a spaced relationship therebetween sufficient for any portion of the work to become lodged therein. The flight bars are formed to a width greater than the distance between the pivotal axes or articulation points formed by the openings 30 and 38 of the hub and yoke members so that, when the links are joined in an endless chain, the front and rear edges of the adjacent flight bars will overlap, as illustrated in Figures 1, 2 and 6.

One of the more important concepts of this invention is the assembly of the elements in a manner which will prevent the separation of the flight bars to provide a spaced relationship therebetween when the chains and the attached bars negotiate a relatively sharp curve, as when traveling about the roller 56 at the entrance and exit portion of the machine or when traveling over the driving sprocket 58. For this purpose, the pad and the intermediate portion 60 between the pad and the link is secured to a lower portion at the center of the link to provide a depressed portion in the area 60 which receives the periphery of the drum and liner during rotational movement and which positions the pad 24 so that the flight bar 22 mounted thereon will have its center in crosswise alignment with the center of the line drawn between the two points of articulation in the chain link. In this arrangement, the flight bars will retain the same spaced relationship as the links and will thus turn about the same axes so that complete control will constantly be maintained to keep the flight bars in an overlapping relation during a straight run and to keep the edges of the flight bars in substantial contacting relation one with a portion of another during travel about a curvilinear path, as schematically illustrated in Figure 6.

To maintain the desired overlapping and contacting relation while having its center aligned with the center between the articulation points of the link, it is essential to mount the flight bars at a slight angular tilt with respect to the link. For this purpose, the pad on the end of each link is formed with its upper face at an incline, the degree of incline depending upon the width of the flight bars and the thicknesses thereof. Generally, the tilt may be determined by dividing the thickness of the bar with the distance between the articulation points of the link so that the length of bar between articulation points will clear the bar rearwardly and the bar forwardly thereof. The degree of overhang (or greater width of the flight bars) is of relative unimportance but it is desired to provide for minimum overlap.

As illustrated in Figure 5, a line 62 between the centers of the pivot points of the link will, at its center 64, coincide with the cross-over points of the diagonals 66 and 68, as shown in Figure 5, thereby to provide for the same axis about which both the links and the flight bars turn. When the described relationship is provided, the flight bars form a continuous support which retains its continuity without separation to provide openings therebetween as the elements turn more sharply about an arc. It will be understood that slight deviations from the slight angular relationship described and arrangement may be embodied although not to the extent of the offset previously employed in such constructions.

The underside of the links 26 is formed with cavities 70 to receive the lugs 72 extending outwardly from the driving sprocket 58 to cause endwise displacement of the link chain. A reversible motor (not shown) is connected to drive the sprocket 58 in the one direction shown by the arrow in Figure 1 when loading and operating the wheel and in the opposite direction for unloading. A separate drive may be provided for the drum 10 but it is preferred to have the drum driven by the chain link for rotational movement of the drum at a peripheral speed corresponding to the linear speed of the chains. The roller 56 and the guide roller 74 are journalled in the frame members for free rotational movement with the chain link.

As illustrated in Figures 5 and 6, the flight bars are reinforced and stiffened by elongate ribs 76 which are secured, as by welding, to the bottom side of the flight bars lengthwise along the centers thereof.

In operation, the driving motor is operated to turn the sprocket 58. The lugs of the sprocket which are enmeshed with the undercuts in the links cause the link chain to travel in the one direction about the sprocket 58 and the rollers 56 and 74. The flight bars move with the links to provide a continuously traveling substantially continuous support on which the work is carried.

The periphery of the drum 10 and the lining 14 ride in the depressed portion 60 of the link assembly which connects the pads to the link so that the flight bars on the pads are disposed inwardly of the face of the linings 14 and above the peripheral edge thereof to provide an overlap between the ends of the bars and the drum, as outlined in Figure 4. This minimizes the development of a spaced relationship between the linings and the flight bars to prevent work from becoming entrapped therebetween.

When the flight bars are advanced in the direction of the arrow in Figure 1, the work will be carried into the machine and tumbled continuously one over another. When advanced in the reverse direction, the flight bars will carry the work over the hump about the roller 56 for delivery into a waiting receptacle. The abrasive particles thrown onto the tumbling work will sift downwardly gravitationally and fall through the plurality of openings 78 provided in the flight bars, first through the upper flight and then through the underlying return flight into a receptacle therebeneath. The latter will be provided with means for the recovery of abrasive for re-use with separation means to remove foreign material, as will be pointed out in a companion case.

It will be apparent from the foregoing that I have provided an improved construction which avoids such separations between the flight bars as have heretofore enabled work and material to become entrapped therebetween with resultant destruction of the bars or damage to the machine. It will be apparent further that I have provided additional improvements with respect to the chain and link assembly to improve its life and operation as well as ability to support the flight bars in position to maintain an improved sealing relationship as between the drum and as between the bars in operation.

It will be understood that changes may be made in the details of construction and operation without departing from the spirit of the invention, especially as defined in the following claims.

I claim:
1. In a machine of the type described having a pair of laterally spaced disc-shaped drums mounted for rotational movement and rollers spaced outwardly of the drums one of which comprises a driving sprocket, a pair of endless link chains formed of a plurality of links pivotally connected at their forward ends to the rearward end portions of links in advance thereof to provide a front and back articulation point for each link, said link chains being operable about the sprocket and rollers located outwardly of the drums, and flight bars extending crosswise between the links of the spaced link chains and connected at their ends thereto for travel therewith and in which the flight bars are dimensioned to have a length corresponding to the spaced relation between the drums for operation therebetween and dimensioned to have a width greater than the distance between the articulation points of the attached chain links so that the flight bars overlap one another at their edges with the flight bars having their centers between articulation points substantially aligned with the center of a line drawn between the articulation points of the link, in which the flight bars are mounted at a slope relative to the chain link corresponding to the included angle of a right triangle having the side opposite the included angle dimensioned to correspond to the thickness of the bar and the hypotenuse dimensioned to correspond to the distance between the articulation points of the link.

2. A machine as claimed in claim 1 which includes pads extending inwardly from the links beyond the drums and which are tilted at their upper face to correspond with the slope of the flight bars, means for securing the flight bars at their ends to the upper face of the pads and in which the pads are spaced below the line between the articulation points of the link at its center by an amount corresponding to about one-half the thickness of the flight bars.

3. A machine as claimed in claim 2 in which a portion connecting the pads to the link and aligned with the periphery of the drum is recessed to enable the periphery of the drum to ride thereon at a level below the upper edges of the attached flight bars.

References Cited in the file of this patent

UNITED STATES PATENTS

| | | |
|---|---|---|
| 1,882,443 | Peik | Oct. 11, 1932 |
| 2,563,084 | Turnbull | Aug. 7, 1951 |
| 2,716,310 | Moore | Aug. 30, 1955 |
| 2,724,929 | Moore | Nov. 29, 1955 |